Jan. 5, 1926. 1,568,159
C. F. HEYWOOD
HIGH PRESSURE VALVE
Filed Nov. 10, 1924
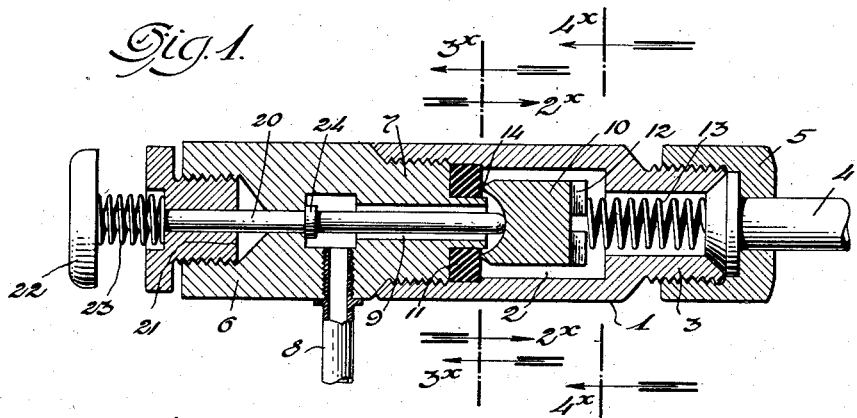
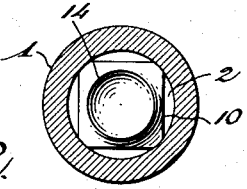
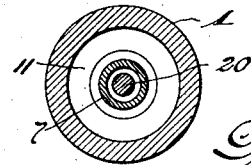
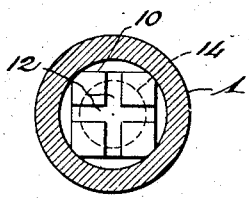
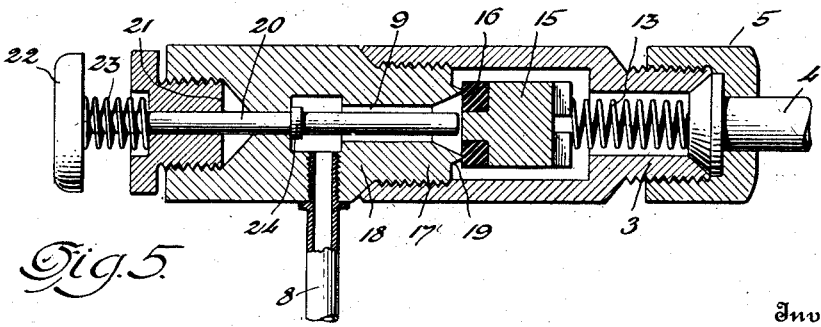
Inventor:
Charles Frederic Heywood Patented Jan. 5, 1926.

1,568,159

UNITED STATES PATENT OFFICE.

CHARLES FREDERIC HEYWOOD, OF DETROIT, MICHIGAN.

HIGH-PRESSURE VALVE.

Application filed November 10, 1924. Serial No. 748,925.

*To all whom it may concern:*

Be it known that I, CHARLES FREDERIC HEYWOOD, a subject of the King of Great Britain, residing at Detroit, in the county of Wayne and State of Michigan, have invented certain new and useful Improvements in High-Pressure Valves, of which the following is a specification, reference being had therein to the accompanying drawings.

This invention relates to valves for pneumatic or hydraulic use, particularly where high pressures are to be contended with and where it is desirable that a valve of the check type be utilized for the automatic control of fluid flow in one direction.

In such valves it is very desirable that an effective and leak-proof seating be secured and that complicity of parts or operation should be avoided in order to ensure reliability in the functioning thereof.

To this end, I propose by my invention to provide a valve wherein an effective sealing is secured by the utilizing of a seat of a hard but slightly impressionable material and of a valve adapted to create an impression on the said seat or vice versa, and thereby ensure a conformity between the meeting faces of the seat and the valve which will effectively seal the said valve against leakage when closed at all times; and wherein the higher the pressure to which the valve is subjected the more efficient the sealing thereof will be without tendency to stick or be otherwise rendered inoperable.

A further object is to provide a check valve including a co-acting valve and seat wherein one of the co-acting parts is provided with a sharp annular edge and the other of said co-acting parts is adapted to receive or maintain a slight impression from said annular edge as a result of fluid pressure to which the valve of said check valve is submitted; and a still further object is to provide a valve of this type wherein the impression may be primarily provided and the operation of the said valve ensures the maintaining of the said impression in efficient conformity with the part co-acting therewith.

Further objects subsidiary to or resulting from the aforesaid objects, or from the construction or operation of the invention as it may be carried into effect, will become apparent as the said invention is hereinafter further disclosed.

In carrying the said invention into effect I may provide, in a tubular valve casing, inlet and outlet passages communicating with a valve chamber wherein is arranged a seat member and a valve member proper which latter is maintained resiliently seated whereby it will act as a check valve, said valve member and said valve seat co-acting to normally close the valve and one of them being of a hard but slightly impressionable material and the other provided with a sharp annular edge adapted to enter or form a corresponding impression in the co-acting part whereby effective seating and sealing of the valve member is rendered possible; and I may further provide manual means extending from the valve casing and adapted to actuate the valve member whereby manual operation of the said valve may be effected when desired, all of which is more particularly described and ascertained hereinafter, by way of example, having reference to the accompanying drawing, wherein—

Figure 1 is a longitudinal sectional view of a check valve constructed in accordance with the said invention;

Figure 2 is a transverse section of the same taken on the line 2*x*—2*x* of Figure 1;

Figure 3 is a transverse section taken on the same line, looking in the opposite direction;

Figure 4 is a transverse section taken on the line 4*x*—4*x* of Figure 1; and

Figure 5 is a similar view to Figure 1, illustrating a modified form of the invention.

Similar characters of reference indicate similar parts in the several figures of the drawing.

Referring more particularly to Figures 1 to 4, a valve casing is illustrated as comprising a tubular body portion 1 enclosing a valve chamber 2 and having a reduced and threaded outlet end 3, to which an outlet or inlet pipe 4 (according to the direction of flow through the valve) may be secured by a nut 5; the other end of the said body portion receiving a plug 6, the reduced end 7 of which enters the open end of the valve chamber, this plug being provided with an inlet (or outlet) pipe 8 leading to a central passage 9 therein.

10 is the valve proper of approximately cubical form which co-acts with a seat 11 sealed in the chamber 2 by the inner end of the plug 6, the said valve proper being preferably rotatable in its chamber and of such size and shape that there is a clearance therearound permitting the passage of fluid therearound when the valve is open; and 12 are slots or passages in the base of the said valve proper to facilitate free passage of fluid around said valve proper.

13 is a valve spring normally retaining the valve proper seated against the member 11.

In order to ensure a thoroughly efficient seating of the said valve, I make the valve seat 11 in this case of a hard, slightly impressionable material, such for example as of fiber or vulcanized rubber, and provide the valve proper with an annular knife edge 14, which edge is adapted to form an impression on the presented surface of the said seat and thereby slightly imbed itself therein, with the result that an efficient sealing of the valve when closed is ensured.

This impression in the seat may be secured by the use of the valve, but it is preferred that the impression be primarily provided at the time the valve is made, either by means of the bringing of the valve and seat forcefully together for that purpose or by means of a suitable tool having an annular edge similar to that of the valve proper with which the seat is to be used. However, it is intended in use, whether an impression has been previously provided in the valve seat or not, that such impression will be thereafter provided by the valve or maintained thereby for the purpose of securing continued conformity between the said valve proper and its seat.

In Figure 5 a different form of valve proper 15 is shown, wherein the said valve proper is faced with a disk or washer 16 of hard impressionable material and the reduced end 17 of the plug 18 is provided with an annular knife edge 19 creating or maintaining the impression in the said disk 16 of the said valve proper.

It is sometimes desirable that provision should be made for the manual operation of the valve proper, in which case I may provide a valve operating stem 20 passing through a stuffing box 21 and the head of the plug 6 or 18, as the case may be, and suitably engaging the valve proper, said stem being provided with an operating head or button 22 and if thought necessary or desirable with a spring 23 actuating against the said head in the manner shown.

The said rod 20 is also shown as being provided with an annular abutment 24 thereon which engages the end wall of the inlet passage 9 of the plug and serves both the purpose of limiting the outward movement of the said stem as well as forming a seal at the point at which the said stem passes outwardly through the plug thereby preventing or assisting in the prevention of the escape of fluid from the plug at this point.

This invention may be developed within the scope of the following claims without departing from the essential features of the said invention, and it is desired that the specifications and drawings be read as merely illustrative and not in a limiting sense, except as necessitated by the prior art.

What I claim is:—

1. In a valve of the type described, a chambered casing, a valve seat member in said casing, and a valve member slidably and longitudinally engaging said casing at various points in its perimeter, and provided with radial slots in its rear end whereby free passage of fluid therearound is ensured in all of its open positions.

2. In a valve device of the type described, a chambered casing, a valve seat member in said casing, and a stemless valve member longitudinally movable in, guided by and rotatable about the axis of said casing, said valve member being of approximately cubical form whereby passages are formed in its sides, said valve member also having passages in its rear end communicating with said side passages, one of said members having a continuous sharp seating edge adapted to create and enter an impression in the other of said members.

3. In a valve device of the type described, a chambered casing, a detachably mounted valve seat member therein, a valve member freely movable longitudinally in and rotatable about the axis of said casing, said valve member having air passages in its sides, and a manually operable valve unseating rod extending towards said valve member through said seat member and outwardly from the device, said rod having a stop thereon limiting its withdrawal from said device and preventing leakage around said rod.

4. In a valve of the type described, a chambered body portion having a passage leading into one end thereof, a valve seat in the other end of said body portion, a plug entering said body portion and sealing said seat therein, said plug having a passage therethrough to the chamber of said body portion, a valve member having air passages in its sides freely movable longitudinally in and rotatable about the axis of said body portion, resilient means seating said valve member on said seat member, and a valve unseating rod extending through said plug to said valve member.

In testimony whereof I affix my signature.

CHARLES FREDERIC HEYWOOD.